United States Patent [19]

Lazear et al.

[11] 4,150,170

[45] Apr. 17, 1979

[54] ULTRAVIOLET INITIATOR SYSTEMS FOR PRESSURE-SENSITIVE ADHESIVES

[75] Inventors: Nelson R. Lazear, Chatham; Robert W. Stackman, Morristown, both of N.J.

[73] Assignee: Celanese Corporation, New York, N.Y.

[21] Appl. No.: 882,846

[22] Filed: Mar. 2, 1978

[51] Int. Cl.$^2$ ............................................... B05D 3/06
[52] U.S. Cl. .................................... 427/54; 427/207 B
[58] Field of Search ................................. 427/54, 207

[56] References Cited

U.S. PATENT DOCUMENTS

| | | | |
|---|---|---|---|
| 4,028,204 | 6/1977 | Rosen et al. | 427/54 |
| 4,065,368 | 12/1977 | Holtzman | 427/54 |

*Primary Examiner*—Bernard D. Pianalto
*Attorney, Agent, or Firm*—Kenneth A. Genoni

[57] ABSTRACT

An improved process and product for use in ultraviolet curable pressure-sensitive adhesives is disclosed. The product, a standard ultraviolet curable pressure-sensitive adhesive to which has been added a benzoin $C_1$–$C_{12}$ hydrocarbon alkyl ether and a triplet state sensitizer, exhibits adhesive strength properties which are substantially greater than those of prior art systems.

4 Claims, No Drawings

ULTRAVIOLET INITIATOR SYSTEMS FOR PRESSURE-SENSITIVE ADHESIVES

BACKGROUND OF INVENTION

This invention relates to pressure-sensitive adhesives. More particularly this invention relates to ultraviolet curable pressure-sensitive adhesives and methods for improving the coated state properties of these adhesives.

The use of ultraviolet curable pressure-sensitive adhesives is known. See, for example, an article by Dowbenko et al, entitled "Radiation Polymerization for Pressure-Sensitive Adhesives" in Chemtech, September 1974, p. 539. This article and patents, such as U.S. Pat. Nos. 3,424,638, 3,551,311, 3,328,194, and 3,725,115 disclose that many conventional ultraviolet systems may be made useful in pressure-sensitive applications by simply applying them to the desired substrate and curing by ultraviolet radiation. No substantial modification of traditional prior art ultraviolet curing technology is suggested in this article or in these patents.

However, prior art ultraviolet curable pressure-sensitive adhesives have been deficient in a number of properties, particularly adhesive and cohesive strengths.

Thus, it is an object of this invention to prepare pressure-sensitive adhesive systems curable by ultraviolet light, which systems have improved cohesive and adhesive strength.

It is another object of this invention to prepare ultraviolet curable pressure-sensitive adhesives having improved substrate adhesion.

These and other objectives are obtained by preparing the compositions according to the methods of the instant invention.

SUMMARY OF INVENTION

This invention involves the discovery that improved adhesive strength in pressure-sensitive ultraviolet curable adhesives may be obtained when photoinitiators comprising a combination of a benzoin $C_1$–$C_{12}$ hydrocarbon alkyl ether and a triplet state sensitizer in initiating amounts are utilized. This invention also involves a process whereby prior art pressure-sensitive adhesive compositions are modified with these initiators in initiating amounts and exposed to ultraviolet radiation, producing pressure-sensitive adhesives having improved adhesive strengths.

DESCRIPTION OF INVENTION

The compositions of the instant invention contain about 0.5 to about 20 percent, by weight, based on the ultraviolet curable portion of the system, of a benzoin $C_1$–$C_{12}$ hydrocarbon alkyl ether, preferably about 1 to to about 10 percent, by weight. Examples of such ethers include the ethyl, propyl, butyl, isopropyl, isobutyl, 2-ethylhexyl, amyl, isoamyl ethers of benzoin.

The compositions also contain about 0.001 to about 1.0 percent, by weight on the same basis, of a triplet state sensitizer or energizer, having a triplet state energy of about 40 to about 60 K cal/mol. Examples of these materials include eosin-Y which has the formula:

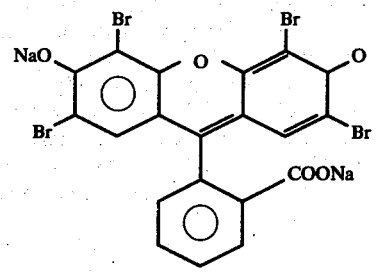

pyrene, fluorescein, transstilbene, and the like.

Generally the compositions of the instant invention may comprise any of the compositions previously used in preparing pressure-sensitive adhesives, and particularly any of the compositions previously used in ultraviolet curable systems. Thus, in most instances, a polymer composition is added to an alpha beta ethylenically unsaturated vinyl polymerizable monomer or mixture of monomers which act as diluents. The ratios of these materials will depend on the desired end viscosity, with more monomeric or diluent materials being added to decrease the viscosity. Preferably the pressure-sensitive adhesives of the instant invention should have application viscosity in the range of about 20,000 to about 200 cps. The polymer may be essentially inert or it may be modified so that its backbone contains unsaturation groups which may participate in the ultraviolet curing reaction through vinyl polymerization.

It is preferred that in order for the compositions of the instant invention to be pressure-sensitive, they must have a glass transition temperature of about $-10°$ to $-60°$ C. or lower, preferably about $-10°$ to $-45°$ C. The glass transition temperature is calculated from the Fox equation, wherein the reciprocal of the polymer glass transition temperature in degrees Kelvin is equal to the summation of the weight fractions of the monomers divided by the glass transition temperatures of their respective homopolymers.

The compositions of the instant invention contain monomeric materials or diluents, hereinafter referred to, and polymeric materials.

Included among the polymers not containing unsaturation groups are the polyolefins, modified polyolefins, the vinyl polymers, polyethers, polyesters, polylactones, polyamides, polyurethanes, polyureas, polysiloxanes, polysulfides, polysulfones, polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/propylene/5-ethylidenebicyclo[2.2.1]hept-2-ene); polyethylene; polypropylene; synthetic rubbers, e.g., butadiene/acrylonitrile copolymers and chloro-2-butadiene 1,3-polymers; the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran, polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

Diluent or reactive monomers which may be used herein include the tradiational monounsaturated monomers, including styrene, 4-methylstyrene, alphamethylstyrene, and the like; acrylic acid and its nitrile, amide and $C_1$-$C_{12}$ alkyl, aryl, or hydroxy alkyl derivatives, such as acrylonitrile, ethylacrylate, 2-ethylhexyl acrylate, butoxyethoxyethyl acrylate, hydroxyethyl acrylate, as well as others; the vinyl halides, such as vinyl chloride, vinylidene chloride, and the like; vinyl ketones such as vinyl phenyl ketone, vinyl methyl ketone, alpha-chlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole and the like. Generally any alpha beta ethylenically unsaturated monomer which does not interfere with the ultraviolet curing mechanism may be utilized, and as such, these monomers are well known in the art.

In addition, polyfunctional unsaturated materials, i.e., materials containing at least two vinyl polymerizable groups per molecule, may be utilized. Included are unsaturated esters of polycarboxylic acids, and particularly such esters of the alpha methylene carboxylic acids, e.g., ethylene glycol diacrylate, diethylene glycol diacrylate, glycerol diacrylate, glycerol tri-acrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra-acrylate and methacrylate, trimethylolpropane tri-acrylate, trimethylolethane tri-acrylate, dipentaerythritol hexacrylate, tripentaerythritol octa-acrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1500, and the like; unsaturated amides, particularly those of the alpha methylene carboxylic acids, especially those of alpha, omega-diamines, and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gammamethacrylamidopropoxy)ethane, beta-methacrylamidoethyl methacrylate, N-beta-hydroxy-ethyl-beta-(methacrylamido) ethyl acrylate, and N,N-bis(beta-methacryloxyethyl) acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

In addition, the instant invention may involve the use of polymeric materials to which an unsaturated substituent is attached. These polymeric backbones include materials such as the alkyds, the polyesters, the polyamides, the polyurethanes and vinyl homo- or copolymers. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

The properties of the adhesive materials prepared may be further modified by the use of reactive thermosetting phenol-formaldehyde resins, epoxy resins, polyturpene resins or turpene phenolic resins. Ester resins and thermoplastic or non-reactive phenolic resins are also useful herein. In addition, the adhesive compositions may be further modified with small amounts of fillers, dyes, pigments, extenders, etc. to obtain special effects.

The pressure-sensitive adhesives of the instant invention adhere to a wide variety of surfaces. For example, glass, metal, various plastics, wood, paper, fiber and the like. These adhesives have excellent holding power at elevated temperatures and are resistant to water, salt water, petroleum products and oil.

Flexible supports that may be used in the process of the instant invention include paper, fabric of all kinds, fiber fleece, plastic sheeting, modified natural substances, metal foil, metalized plastic sheeting, asbestos fiber fabric, glass fiber fabric and the like. The pressure-sensitive adhesive tapes obtained from the instant invention can be used for a variety of purposes, including tacking purposes, as films for documents, self-adhesive films suitable for writing, decorative sheeting, labels or for the production of plaster for dressings. In addition, they have excellent electrical insulation properties.

According to the instant invention, the desired adhesive composition is applied to the chosen flexible support to film thicknesses of about 0.1 to about 5 mils. Any number of methods of application may be employed, including spraying, roll coating, and the like. In addition, in some instances it may be desirable to partially heat-cure the binder in the adhesive layer by exposing the applied coating to a heat treatment during or subsequent to application and prior to the ultraviolet curing step.

The term "ultraviolet," as used herein, contemplates electromagnetic radiation having wave lengths of above about 2000 Angstroms, preferably about 2000 to about 5000 Angstroms. In addition, electronic beam curing is also contemplated herein. Where ultraviolet light sources are employed, exposure times can range from about 0.1 seconds up to about 1 minute per linear foot, and generally the light radiation will have a power of about 1 to 600 watts per linear inch coming from low, medium, or high pressure ultraviolet lamps.

In the following examples, all percentages are by weight unless otherwise mentioned.

EXAMPLE 1

A mixture of 158 parts of butylacrylate, 35 parts of vinyl acetate, 6 parts of acrylic acid, and 0.3 parts of azodiisobutyrlnitrile (AIBN) was added to a reactor containing 500 parts of chloroform over a 20-minute period at 60° C., and the contents were held at this temperature for about 10 hours. The solvent was then stripped off on a rotary evaporator, resulting in a product having an intrinsic viscosity in chloroform of 1.14.

EXAMPLE 2

Example 1 was repeated utilizing 96.4 grams of butyl acrylate, 36 grams of vinyl acetate, 0.3 grams of AIBN, and 500 milliliters of benzene as solvent. The product which resulted had an intrinsic viscosity in chloroform of 1.09.

EXAMPLE 3

Example 1 was repeated except that 10 percent, by weight, of Staybelite Ester 3 (Hercules), a rosin ester type tackifier, was added to the resulting polymer.

EXAMPLE 4

Example 3 was repeated utilizing 20% Staybelite Ester 3.

EXAMPLE 5

The examples above were blended with various monomers and initiators, applied to a film thickness of 1 mil on Celanar (a Registered Trademark of the Celanese Corporation) polyethylene terephthalate film, and cured under several schedules using an Hanovia medium pressure 200 watt mercury vapor lamp. Peel strength was evaluated by attaching a 1"×11" coated strip to a 302 stainless steel panel, bending the unstuck part of the tape back 180° and pulling, with the peel strength being the number of pounds per inch required to completely remove the tape from the panel. All the tests were carried out at 73° F. under 50 percent relative humidity.

EXAMPLE 6

Example 1 was evaluated in a blend containing 5 parts of the polymer, 7.79 parts butyl acrylate, 1.71 parts vinyl acetate, 0.29 parts acrylic acid, and 0.2 parts hexanediol diacrylate. The ratio of the polymer to monomer was 0.5. The initiator employed was 2.5 percent, by weight, of a 99.9 percent benzoin isobutylether-/eosin-Y mixture. The material was cured in 3 passes at 40 ft/min. under a 200 watt/in. ultraviolet Hanovia lamp. Evaluation of the panel showed that it has a peel strength of 1.4 pounds per inch$^2$.

EXAMPLE 7

The preceding example was repeated except that a benzophenone/dimethylaminoethanol initiator was used at the 2.5 percent by weight level, and that a cure schedule of 3 passes at 40 ft./min. was employed. The resulting product exhibited a peel strength of 0.1 lb.

EXAMPLE 8

5.00 parts of the polymer prepared in Example 2 were blended with 5.49 parts of butyl acrylate, 1.21 parts of vinyl acetate, and 0.13 parts of hexanediol diacrylate, resulting in a product having a polymer-to-monomer ratio of 0.7. 1.44 percent, by weight, of benzoin isobutyl ether $1.44 \times 10^{-3}$ percent by weight eosin-Y blends were added, and a 3 passes at 40 fpm cure schedule was employed. The product which resulted exhibited a peel strength on separate evaluations of 1.26 and 0.95 pounds/inch$^2$.

EXAMPLE 9

The preceding example was repeated utilizing a mixture of 19.4 parts of the polymer, 39.77 parts of butyl acrylate, 10.23 parts of vinyl acetate, 0.6 parts acrylic acid, 1.00 parts of hexanediol diacrylate, a polymer-to-monomer ratio of 0.3, and the same initiators and cure schedule. The product which resulted had a 1.0 lbs/in$^2$ peel strength.

EXAMPLE 10

20 parts of the polymer of Example 1 were blended with 39.77 parts of butyl acrylate, 10.23 parts of vinyl acetate, and 1.00 parts of hexanediol diacrylate, producing a product having a polymer-to-monomer blend ratio of 0.4. 71 parts of this material were blended with 2.5 parts of benzoin isobutyl ether and $2.5 \times 10^{-3}$ parts of eosin-Y and cured according to the cure schedule of the previous example. A product having a peel strength of 1.0 lbs/in$^2$. resulted.

EXAMPLE 11

3.36 parts of the polymer prepared in Example 3 were blended with 6.90 parts of butylacrylate, 1.52 parts of vinyl acetate, 0.26 parts of acrylic acid, and 0.18 parts of hexanediol diacrylate, resulting in a product having a polymer-to-monomer ratio of 0.3. This material was blended with 0.44 parts of benzoin isobutyl ether and $4.4 \times 10^{-4}$ parts of eosin-Y and was cured using the cure schedule in the preceding example, resulting in a product having a peel strength of 1.45 lbs/in$^2$.

EXAMPLE 12

The preceding example was repeated using the polymer from Example 4, and the cure schedule of 2 passes at 40 fpm. The resulting product had a peel strength of 2.0 lbs./in$^2$.

What is claimed is:

1. A process for preparing a pressure-sensitive adhesive having improved strength properties which comprises:
   (a) forming a pressure-sensitive ultraviolet reactive composition containing alpha beta ethylenically unsaturated vinyl polymerizable monomers and, based upon the polymerizable system, about 0.5 to about 20 percent, by weight, of a benzoin $C_1$-$C_{12}$ hydrocarbon alkyl ether and about 0.001 to about 1.0 percent, by weight on the same basis, of a triplet state sensitizer having a triplet state energy of about 40 to about 60 k cal/mol;
   (b) applying the resulting composition to a substrate to a film thickness of about 0.1 to about 5 mils; and
   (c) subjecting the coated substrate to ultraviolet radiation for about 0.1 to about 1 minute per linear foot; wherein the glass transition temperature of the pressure-sensitive composition is about −10° to −60° C.

2. The process of claim 1 wherein the glass transition temperature of the pressure-sensitive composition is about −10° to about −45° C.

3. The process of claim 1 wherein the ultraviolet radiation has a wave length in the range of about 2000–5000 Angstroms.

4. The process of claim 1 wherein the triplet state sensitizer is eosin-Y and the benzoin alkyl ether is benzoin isobutyl ether.

* * * * *